United States Patent
Hitzke

[19]

[11] Patent Number: 6,036,403
[45] Date of Patent: Mar. 14, 2000

[54] CABLE BURIAL SYSTEM

[75] Inventor: Frank H. Hitzke, Redmond, Wash.

[73] Assignee: Raytheon Company, Lexington, Mass.

[21] Appl. No.: 09/146,718

[22] Filed: Sep. 3, 1998

[51] Int. Cl.[7] ........................................................ F16L 1/04
[52] U.S. Cl. ............................................ 405/164; 405/180
[58] Field of Search .................................... 405/164, 165, 405/163, 161, 160, 159, 158, 179, 183

[56] References Cited

U.S. PATENT DOCUMENTS

| | | | |
|---|---|---|---|
| 3,333,432 | 8/1967 | Hale et al. | 405/164 |
| 3,423,946 | 1/1969 | Maclay | 405/164 |
| 4,664,553 | 5/1987 | Grinsted et al. | 405/164 |
| 4,892,443 | 1/1990 | Kunze et al. | 405/164 |
| 4,896,998 | 1/1990 | Reece | 405/164 |
| 5,755,530 | 5/1998 | Garren | 405/180 |

*Primary Examiner*—David Bagnell
*Assistant Examiner*—Frederick L. Lagman
*Attorney, Agent, or Firm*—J. W. Powell; G. H. Lenzen, Jr.

[57] ABSTRACT

A cable burial system includes a cable burial tool having a base frame, a blade extending downwardly from the base frame and having a vertically oriented internal slot therein with a slot width, and a feed shoe with an arcuate feed shoe periphery and a feed shoe width less than the slot width of the blade. The feed shoe is pivotably connected to the base frame and is pivotable between a lowered position wherein the feed shoe lies within the slot, and a raised position wherein the feed shoe lies outside of the slot. The feed shoe includes a jet opening in a periphery of the feed shoe, and a source of pressurized water in an interior manifold of the feed shoe in communication with the jet opening in the periphery of the feed shoe. A guide is operable to guide a cable into the slot in contact with the feed shoe periphery when the feed shoe is in the lowered position. The guide includes a feed horn affixed to the base frame with an outlet end adjacent to the upper end of the slot and centered on the slot, and a pair of movable guide plates disposed adjacent to the upper end of the slot and centered on the slot. The guide plates are movable between a closed position centered with a first spacing sufficiently greater than the feed shoe width to permit the feed shoe to lie therebetween, and an open position having a second spacing greater than the first spacing. The cable burial tool is pivotably connected to a burial sled.

18 Claims, 6 Drawing Sheets

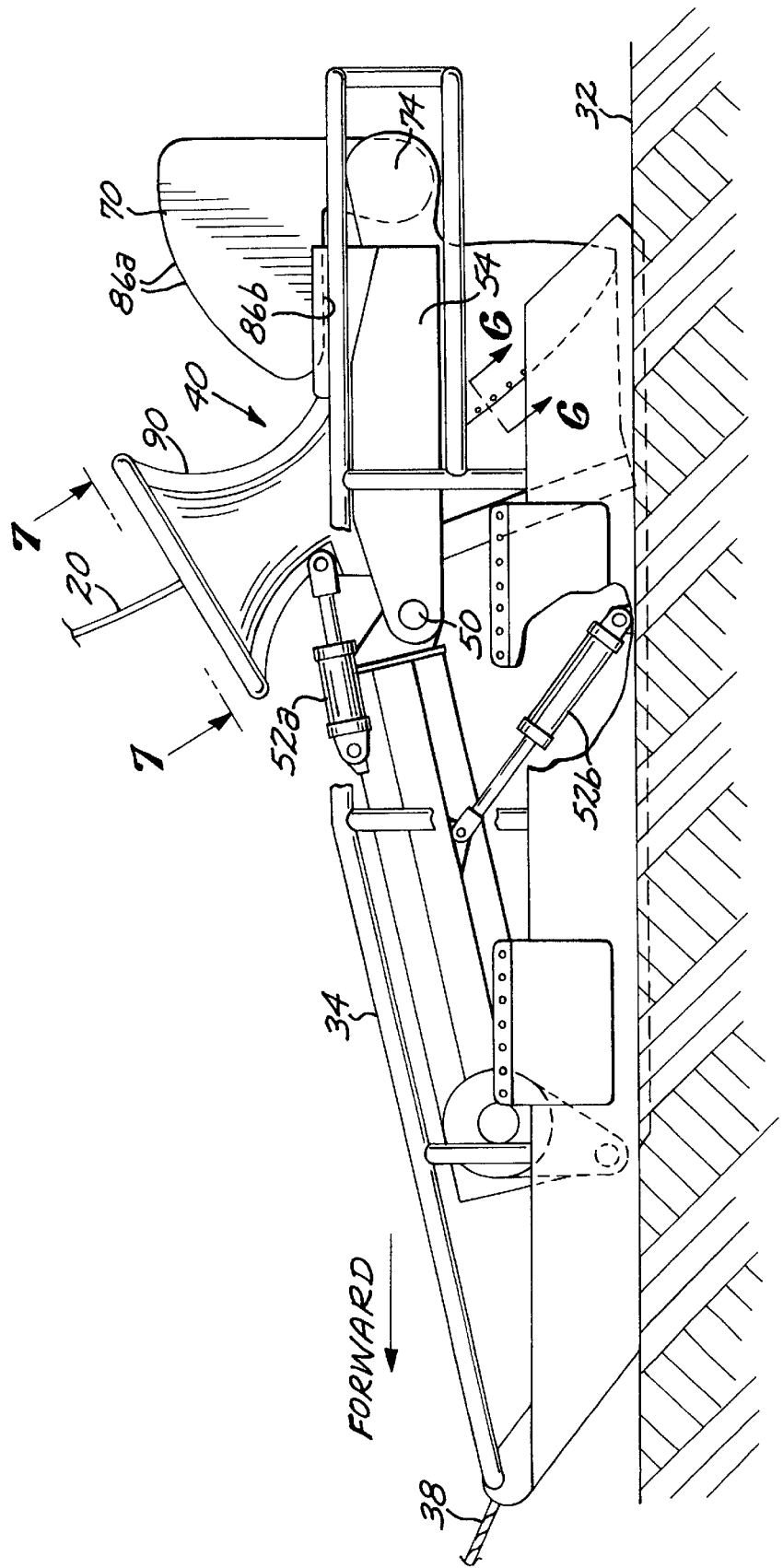

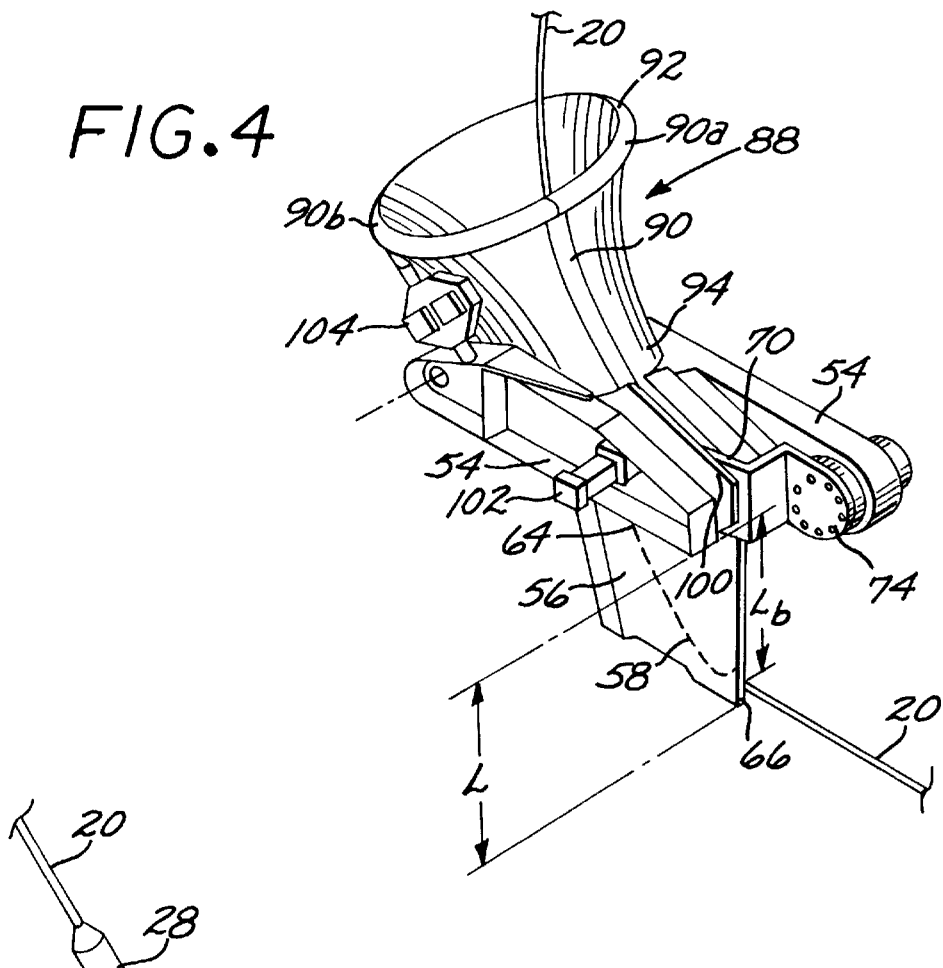
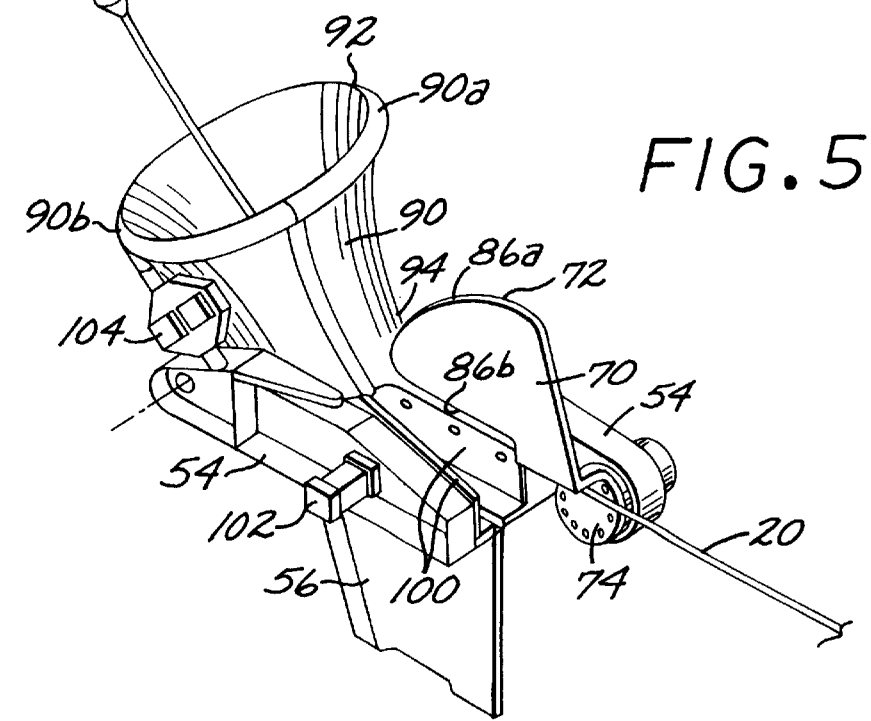

CABLE BURIAL SYSTEM

BACKGROUND OF THE INVENTION

This invention relates to a cable burial tool used in a cable burial system of particular application to the burial of underwater cables in the sea floor.

A substantial portion of the world's transoceanic communications are carried on undersea cables buried in the sea floor. The cable normally includes lengths of signal carrier within a protective jacket, with intermediate amplifiers (termed "repeaters) located along the length of the cable in the case of a long cable. In the past, such cables were formed of copper electrical carriers, but today glass optical fiber cables are also widely used. Copper cables are usually 2–4 inches in diameter. Glass fiber cables are typically smaller in diameter than copper cables, often no more than ½ inch or smaller in diameter. In both cases, the repeaters are present as radial bulges in the cable which are located along its length.

Although the undersea cable may be laid on the top surface of the sea floor, for most applications it is preferred to bury the cable a foot or more below the sea floor. A cable lying on the surface of the sea floor is susceptible to damage due to adverse currents, marine fouling, fish bites, and fishing activities. Burying the cable in the sea floor avoids these types of potential damage to the cable.

A large number of techniques have been used over the years to bury cable in the sea floor. These techniques require the digging of a trench in the sea floor, feeding the cable into the trench, and closing the trench. The burial is accomplished at depths up to several thousand feet below the surface of the water. The cable burial techniques include the use of towed underwater vehicles such as sleds, remotely operated vehicles, and crawlers that crawl on the surface of the sea floor.

While operable, the available techniques all have limitations, particularly when the cable to be buried is a glass optical fiber cable. When the glass optical fiber is buried in the sea floor, provision must be made to pass the larger-diameter repeaters through the cable burial apparatus. There are typically limitations on the minimum bend radius and the maximum load which may be applied to the glass fiber optical cable, which are not met with existing cable burial apparatus. Existing cable burial systems also tend to be complex, which leads to concerns with system reliability. Further, considerations of economics mandate a cable burial apparatus that is operable at as high a linear travel rate as possible.

There is therefore a need for an improved cable burial system, particularly for use in burying optical fiber cables having periodic repeaters. The present invention fulfills this need, and further provides related advantages.

SUMMARY OF THE INVENTION

The present invention provides a cable burial tool and cable burial system of particular utility in burying cables in the sea floor. The cable burial system is operable to bury a wide range of types of underwater cables, including those of relatively small diameter such as glass optical fiber cables, which typically have diameters of from about 0.06 inches to about 0.625 inches. Burial of the cable is performed to depths of up to a few feet in the sea floor, which is sufficient for most applications. The cable burial system may be used to bury cables with radially enlarged features such as repeaters located at varying distances along the length of the cable. The cable burial tool used in the system is much smaller and less costly than prior burial apparatus. The cable burial tool has fewer moving parts and actuators than prior burial apparatus, and is therefore less complex, less prone to failure, and more robust.

In accordance with the invention, a cable burial system comprises a cable burial tool, a burial vehicle such as an underwater sled on which the cable burial tool is supported, and a cable feed winch which supplies the cable from a supply to the cable burial tool. The cable burial tool comprises a base frame, and a blade extending downwardly from the base frame and including an external leading edge. The blade has a vertically oriented internal slot therein with a slot width. The slot has an upper end at a top of the blade and a lower end at a bottom of the blade. A feed shoe has an arcuate feed shoe periphery and a feed shoe width less than the slot width of the blade. The feed shoe is pivotably connected to the base frame and is pivotable between a lowered position wherein the feed shoe lies within the slot, and a raised position wherein the feed shoe lies outside of the slot. A guide is operable to guide a cable into the slot in contact with the feed shoe periphery when the feed shoe is in the lowered position.

The guide preferably includes a feed horn affixed to the base frame, and a pair of movable guide plates disposed adjacent to the upper end of the slot and centered on the slot. The feed horn has an outlet end adjacent to an upper end of the guide plates and centered on the blade. The guide plates are movable between a closed position with a first spacing sufficiently greater than the feed shoe width to permit the feed shoe to lie therebetween, and an open position having a second spacing greater than the first spacing. When the guide plates are closed, the cable is guided into the blade slot and in contact with the periphery of the feed shoe. When the guide plates are opened, the cable and a radial enlargement such as the repeater are allowed to pass through the feed shoe, but do not pass through the slot.

In operation, the blade is lowered into the sea floor and then drawn forwardly through the soil and rocks of the sea floor. As the blade is moved forwardly, it opens a narrow trench in the soil. The cable to be buried passes through the feed horn, between the guide plates, and into the space between the inner wall of the slot and the outer periphery of the feed shoe, when the feed shoe is in the lowered position. The cable is conducted to the lower end of the slot and emerges from the blade slot at the distance below the surface of the soil defined by the vertical location of the lower end of the slot. As the blade is moved forwardly, the cable is paid out the rearwardly facing side of the blade. The base frame is preferably pivotable connected to the burial sled, so that the angle at which the cable leaves the blade and enters the sea floor may be controlled by varying the pivot angle between the base frame and the drag link of the burial sled. This pivotal adjustment accounts for underwater variations in the burial depth in the sea floor and allows the cable to be buried always parallel to the surface of the sea floor.

As the cable is paid out and buried, and a radial enlargement such as a repeater reaches the cable burial tool, the feed shoe is pivoted to the raised position and the guide plates are moved to their open position. The repeater passes through the feed horn, between the opened guide plates, and over the base of the frame. The repeater is thereby passed through the cable burial tool to lie on the surface of the sea floor. After the repeater has passed through the cable burial tool, the guide plates are closed to align the cable with the blade slot and the feed shoe periphery, and the feed shoe is pivoted down to the lowered position, returning the cable to the blade slot so that it is again buried as it is paid out rearwardly from the blade.

The potential frictional wearing contact between the cable and the contacting parts of the cable burial tool is a concern. The frictional wearing contact should be minimized, both to avoid damage to the cable and to reduce the wearing of the cable burial tool. To reduce the effects of friction and wear, a water bearing is created on the periphery of the feed shoe, which is subjected to the greatest frictional forces between the cable and the cable burial tool. To make such a bearing, the feed shoe is constructed as a manifold and jets are provided on the periphery of the feed shoe contacted by the cable. Water under pressure is forced from the interior manifold of the feed shoe and out of the jets, pressing against the cable to serve as a liquid bearing. The greater the water pressure through the bearing jets, the greater the reduction in friction of the cable pressing against the periphery of the feed shoe.

The present approach is suitable for use with a cable feed winch being fed from either a ship that tows the burial sled and base frame, or a cable feed winch located on the burial sled. In the former case, the cable feed may be designed to impart a particular shape to the cable prior to its entry into the guide of the cable burial tool. In a preferred case, a reverse, generally catenary, curvature shape is impressed upon the cable, relative to the curvature experienced by the cable as it passes through the cable burial tool. This reverse catenary curvature prevents tangling and fouling of the cable against the burial sled and the burial tool.

The cable burial system of the invention allows the controlled burying of cables of different types into the sea floor, including small diameter cables with radially enlarged elements such as repeaters located along the length of the cable. The apparatus allows the burying of cable at both low and high speeds of 5 knots or more. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 3A–3B are schematic side elevational views of a burial sled and cable burial tool, wherein FIG. 3A illustrates the cable burial tool in a raised position for storage and FIG. 3B illustrates the cable burial tool in a lowered position for cable burying;

FIG. 4 is a perspective view of the cable burial tool configured to bury cable;

FIG. 5 is a perspective view of the cable burial tool configured to pass a repeater therethrough;

DETAILED DESCRIPTION OF THE INVENTION

Figure 1:
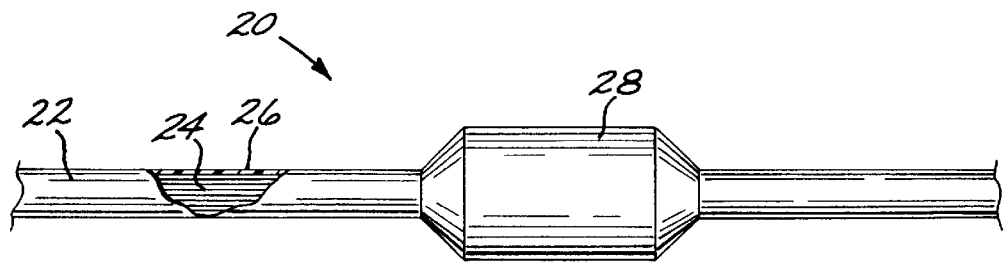
FIG. 1 is a side sectional view of an underwater cable.

FIG. 1 depicts an underwater cable 20 of the type suitable to be buried using the cable burial system of the invention. The cable 20 includes a generally cylindrical cable body 22 having optical fibers 24 or copper electrical conductors enclosed within a protective outer jacket 26. The cable 20 is radially enlarged along its length with a repeater 28, which essentially is an amplifier for the signals carried in the optical fibers 24 or electrical conductors. In a typical case of an optical fiber cable, the preferred application, the cable body 22 has a diameter of from about 0.06 to about 0.625 inches, and the repeater 28 has a diameter of about 3–9 inches and a length of about 48 inches. These dimensions are presented for illustration of the preferred embodiment and not by way of limitations.

Figure 2:
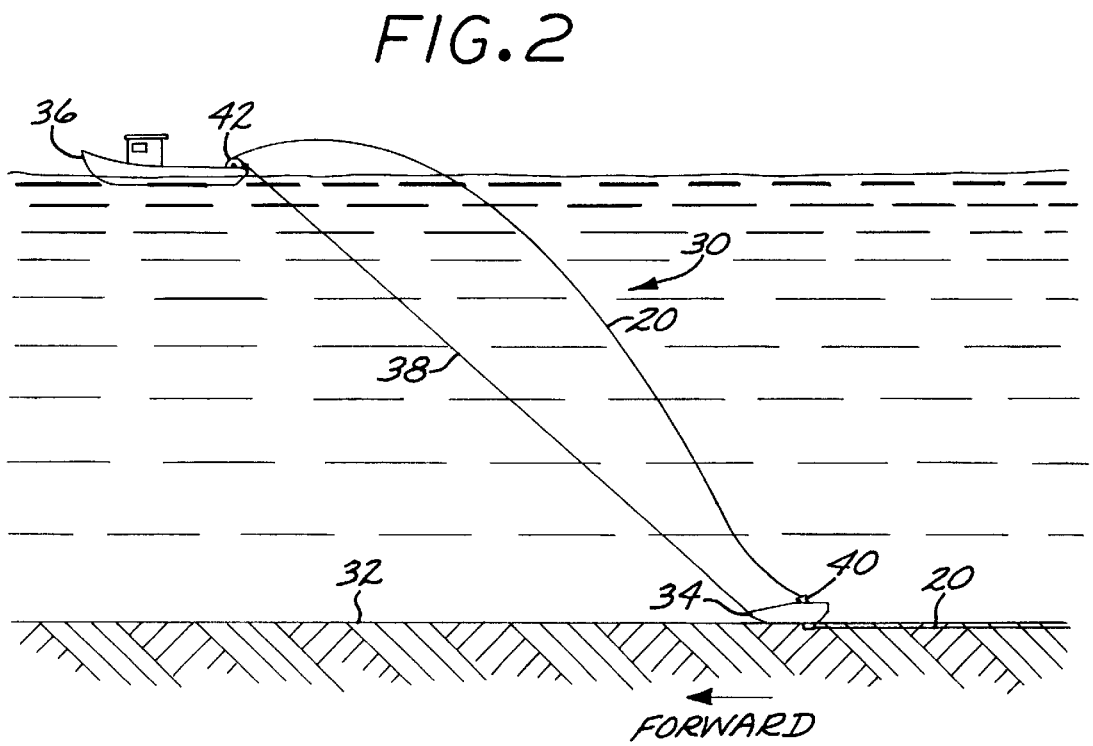
FIG. 2 is a schematic view of a cable being buried into an underwater floor by the cable burial system of the invention.

FIG. 2 depicts a preferred cable burial system 30 according to the invention, for burying cable such as the cable 20 below a sea floor 32. (As used herein in relation to the cable burial system of the invention, a "buried" cable is one having the cable body 22 buried below the surface of the sea floor 32 and the repeaters 28 lying on the surface of the sea floor 32. The "sea floor" 32 includes the bottom of any body of water suitable for burying a cable.) The cable burial system 30 includes a burial sled 34 towed behind a surface ship 36 by an umbilical line 38. The burial sled 34 is towed along the surface of the sea floor 32 in the Forward direction. Equivalently for the present purposes, the burial sled 34 may be towed from a surface platform as illustrated, may be self-propelled, or may be towed from an underwater vehicle. A cable burial tool 40 is pivotably attached to the burial sled 34. The cable 20 is supplied from a cable feed winch 42 mounted on the ship 36, as shown, or which may be mounted on the burial sled 34. The cable feed winch 42 includes a supply of the cable 20, such as a drum with the cable 20 wound thereon, with a variable speed motor to control the rate at which the cable 20 is fed from the supply. The cable feed winch 42 preferably feeds the cable 20 so as to follow a reverse, generally catenary, curvature from the cable feed winch 42 to the cable burial tool 40, as illustrated. This reverse catenary curvature is maintained by feeding the cable such that an excess length of the cable, beyond that required to extend in a straight line from the ship 36 to the cable burial tool 40, is maintained. The reverse catenary curvature of the cable 20 between the ship 36 and the cable burial tool 40 is relative to the curvature experienced by the cable 20 as it passes through the cable burial tool 40, which will be discussed subsequently. The reverse catenary curve of the cable prevents the cable from tangling or fouling in the umbilical line 38, the burial sled 34, or the cable burial tool 40. The cable 20 passes from the cable feed winch 42 to the cable burial tool 40, which buries the cable 20 up to a few feet below the surface of the sea floor 32.

Figure 3B:
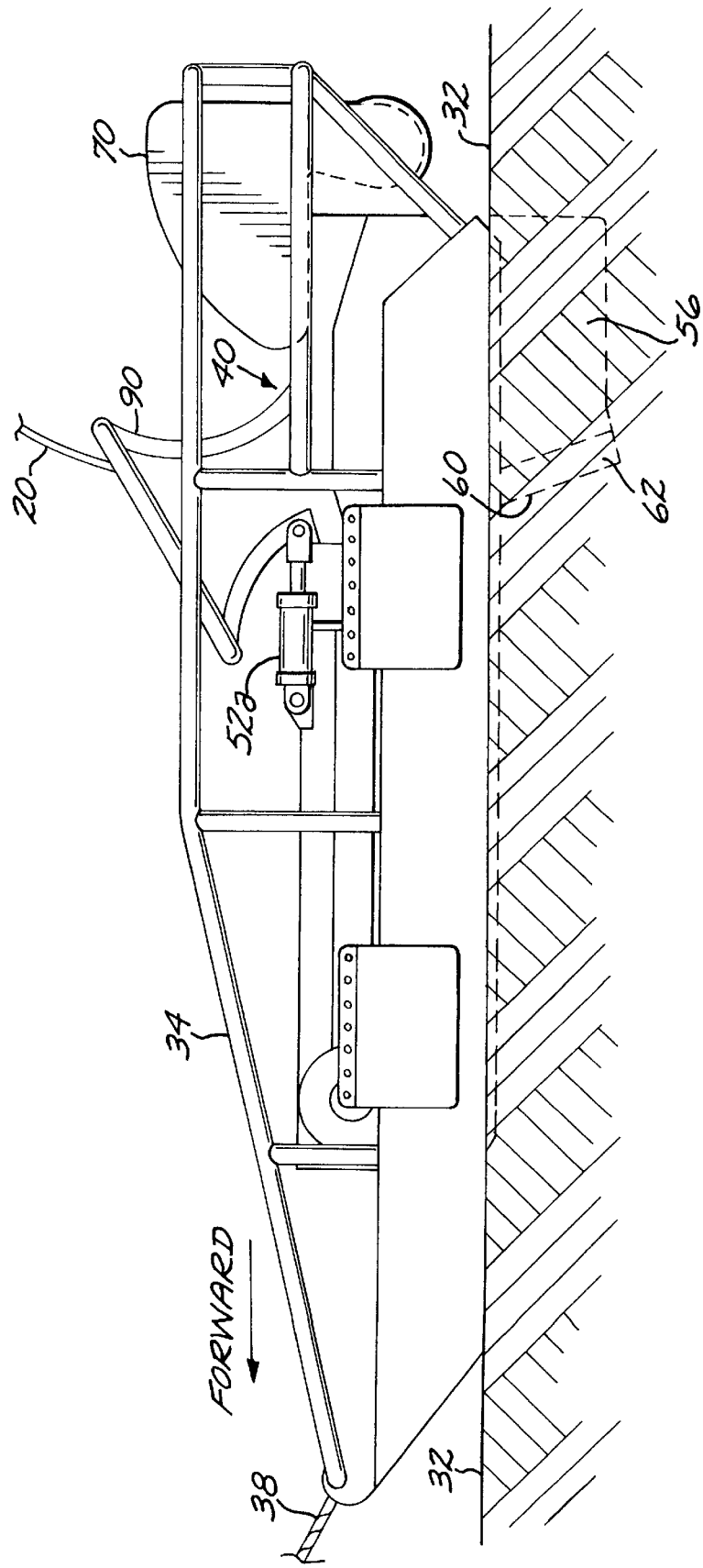

FIGS. 3A and 3B depict the burial sled 34 and cable burial tool 40 in greater detail. (In FIGS. 3A and 3B, the feed shoe, to be discussed subsequently, is shown in its raised position.) The burial sled 34 is a steel frame construction that is towed by the umbilical line 38 along the sea floor 32 in the Forward direction indicated in FIGS. 3A and 3B. The cable burial tool 40 is pivotably connected to the burial sled 34 at a pivot pin 50. The relative angular position of the cable burial tool 40 and the burial sled 34 is determined by an actuator, preferably including a tool angle control cylinder 52a and a drag link cylinder 52b that cooperatively effect rotation of the cable burial tool 40 about the pivot pin 50. The angular position of the cable burial tool 40 determines the angle at which the cable 20 is paid out from the cable burial tool 40, and thence its angle relative to the sea floor 32. The actuator cylinders 52a and 52b also cooperatively raise the cable burial tool 40 to the storage position of FIG. 3A, or lower it to the cable burying position of FIG. 3B.

The cable burial tool 40 is illustrated in greater detail in FIGS. 4–7. The cable burial tool 40 includes a base frame 54, which is a structural frame that supports the remainder of the cable burial tool 40. A blade 56 extends downwardly from the base frame 54. In operation, the blade 56 extends into the soil of the sea floor 32. The downwardly extending length L of the blade 56 determines the depth of the trench dug into the sea floor 32, and consequently the depth $L_b$ to which the cable 20 is buried. The blade 56 is not solid, but instead has a vertically oriented internal slot 58 (FIG. 6) therein of width $W_{slot}$. As the cable burial tool 40 is drawn through the soil of the sea floor 32 (to the left in FIGS. 3–5), a leading edge 60 of the blade 56 is subjected to significant wear forces from the soil, rocks in the soil, and the like. Accordingly, the leading edge 60 is provided with a wear plate 62, made of a hard material such as high carbon plow share steel, to provide resistance to wear damage of the blade 56. The slot 58 may be described as having an upper end 64 at a top of the blade 56 and a lower end 66 at a bottom of the blade. As the cable 20 is laid, it enters the upper end 64 of the slot 58, which is just above the surface of the sea floor 32, and exits the lower end 66 of the slot 58, which is just above the bottom of the blade 56 at a depth $L_b$ below the sea floor 32.

A feed shoe 70 is a platelike structure having a width $W_{shoe}$, which is typically about 1 inch, and an arcuate feed shoe periphery 72. The feed shoe 70 is pivotably attached to the base frame 54 by a hydraulic rotator 74, and the periphery 72 extends for about 90 degrees around the circle having the hydraulic rotator 74 as its center. A portion of the periphery 72 has a constant radius from the center defined by the hydraulic rotator 74. The hydraulic rotator 74 rotates the feed shoe 70 about the center of the hydraulic rotator, and thence relative to the base frame 54 and the blade 56. In a lowered position of rotation of the feed shoe 70, shown in FIG. 4, a portion of the feed shoe 70, the constant radius portion, lies within the slot 58 of the blade 56. In a raised position of rotation of the feed shoe 70, shown in FIG. 5, the feed shoe 70 lies outside of the slot 58. $W_{shoe}$ is selected to be slightly smaller than $W_{slot}$ by an amount sufficient to provide a working clearance but not so large as to encourage rocks to lodge in the clearance gap during operation. Preferably, $W_{shoe}$ is about 0.060 inches less than $W_{slot}$, so that the clearance on each side of the feed shoe 70, when it is inserted into the slot 58, is about 0.030 inches.

The hydraulic rotator 74 preferably rotates the feed shoe 70 from the raised position to the lowered position in a rotational sense such that the periphery 72 of the feed shoe 70 moves tangentially in the same direction as the payout direction of the cable 20, as the periphery 72 engages the cable 20 being paid out to force it downwardly into the slot 58. The feed shoe is thus rotatable in a rotation direction such that the feed shoe periphery moves in the same direction as the direction of cable payout when the feed shoe rotates from the raised position to the lowered position. That is, the cable 20 being paid out is moving in the payout direction through the cable burial tool 40 generally downwardly and to the right in FIGS. 3A and 3B, and the periphery 72 is also moving downwardly and to the right as it rotates from the raised position to the lowered position and at the point where it first contacts the cable 20. Stated equivalently, the feed shoe is rotated in the counterclockwise direction in the left-hand-elevational view of FIGS. 3A and 3B when moving from the raised position to the lowered position. This rotational movement gradually wraps the cable 20 onto the periphery 72 of the feed shoe 70, aids in the payout of the cable 20, and does not stress the cable 20 as the payout continues. This rotational movement also aids in cleaning accumulated silt and rocks from the slot 58, by cleaning jets 86b to be described subsequently, as the feed shoe is rotated from the raised to the lowered position. By contrast, a rotation in the opposite sense from the raised position to the lowered position (clockwise in FIGS. 3A and 3B) would abruptly engage the periphery to the cable with a motion that would tend to hinder the payout of the cable and stress the cable. Such overstressing is potentially harmful to cables, particularly optical fiber cables.

Figure 6:
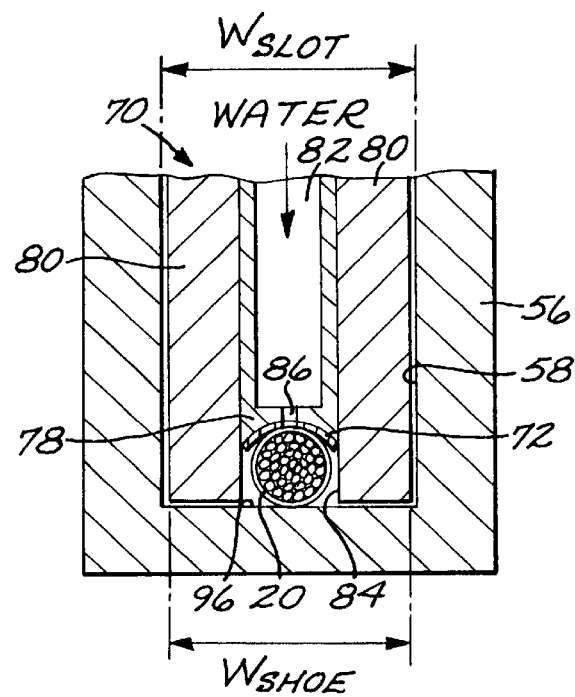
FIG. 6 is a sectional view of the feed shoe, blade, and cable, taken along line 6—6 of FIG. 3A with the feed shoe in the lowered position.
Figure 7:
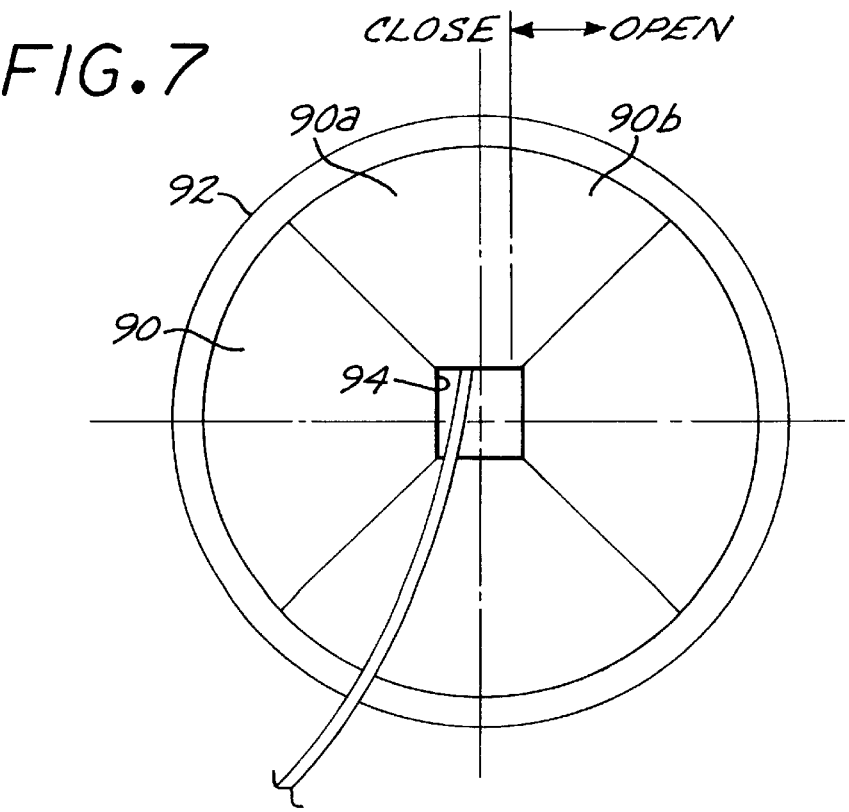
FIG. 7 is an end-on view of the feed horn, taken along line 7—7 of FIG. 3A.

The feed shoe 70 is preferably formed as a hollow water manifold with water jet openings 86 on the periphery and side of the feed shoe 70. In a preferred form, the feed shoe 70 has a structure as shown in FIG. 6. This feed shoe 70 has a central housing 78 with a pair of feed shoe plates 80, one on either side of the central housing 78. The central housing 78 and feed shoe plates 80 define a manifold 82 within the central housing 78. The central housing 78 extends radially a smaller distance than the feed shoe plates 80, so that the central housing 78 and the feed shoe plates 80 cooperatively define a cable guide channel 84 at the feed shoe periphery 72. The central housing 78 is transversely concavely curved along the periphery 72 to about the radius of the cable 20, so as to provide a grooved surface in which the cable 20 rides. The cable 20 is received in and guided by the cable guide channel 84.

The feed shoe 70 does not continuously rotate as the cable 20 passes over it during the burial process, and the cable 20 is forced against the feed shoe periphery 72. The result is frictional forces that tend to wear both the protective outer jacket 26 of the cable 20 and the surface of the feed shoe periphery 72. The frictional forces also increase the axial force on the cable 20. To minimize the frictional loading, a series of jets 86a along the circumference of the feed shoe periphery 72 extend between the outer surface of the periphery 72 and the central cavity 82. During operation, the manifold 82 is pressurized with a source of water, so that pressurized water flows out of the water jets 86a against the surface of the cable 20. The resulting force serves as a water bearing to reduce the frictional force, and thence the wear of the cable and the feed shoe, and the axial loading on the cable 20. There are, additionally, water cleaning jets 86b positioned along the leading edge of the feed shoe 70 which serve to wash accumulated silt and rocks from the slot 58 as the feed shoe 70 is rotated from its raised position toward its lowered position.

A guide 88 is operable to guide the cable 20 into the slot 58 in contact with the feed shoe periphery 72 when the feed shoe 70 is in the lowered rotational position shown in FIG. 4, but to allow the repeater 28 to pass through the cable burial tool 40 when the feed shoe 70 is in the raised rotational position shown in FIG. 5. The guide 88 includes two main components. The first component is a feed horn 90 affixed to the base frame 54 and having a generally funnel shape with a large inlet end 92 and a smaller outlet end 94. Both ends 92 and 94 are sufficiently large in size to permit both the cable 20 and the repeater 28 to pass therethrough. The outlet end 94 is adjacent to and centered on the upper end 64 of the slot 58. Cable 20 entering the feed horn 90 moves through the outlet end 94 and to the location defined by it.

The second part of the guide 90 is a pair of guide plates 100 that are centered on the slot 58 and are disposed adjacent to the upper end 64 of the slot 58. One or, preferably, both of the guide plates 100 are movable between a closed position with a first spacing sufficiently greater than the feed shoe 70 width $W_{shoe}$ to permit the feed shoe 70 to lie therebetween, and an open position having a second spacing greater than the first spacing. The second spacing is selected as sufficiently large to permit any radially enlarged region of the cable 20, such as the repeater 28, to pass between the two guide plates 100.

As shown in FIG. 4, when the feed shoe 70 is in the lowered position and lies within the slot 58, and the guide plates 100 are in their closed positions, the cable 20 is forced into the space between the feed shoe 72 outer periphery and an inner surface 96 of the blade 56. With the feed shoe 70 in this lowered position, the cable 20 is buried into the soil of the sea floor 32. As shown in FIG. 5, when the feed shoe 70 is in the raised position and has been rotated to lie outside of and above the slot 58, and the guide plates 100 are in their open position, the portion of the cable 20 passing through the cable burial tool 40 during that period (typically the repeater 28) is not buried into the soil of the sea floor 32 but instead lies on the surface of the sea floor.

The guide plates 100 are operated in conjunction with the feed shoe 70. When the feed shoe 70 is in the lowered position of FIG. 4, the guide plates 100 are in their closed position with the first, smaller, spacing. This small spacing guides the cable 20 from the outlet end 94 of the feed horn 90 into the cable guide channel 84 between the inner surface 96 of the blade 56 and the outer periphery 72 of the feed shoe 70. When the feed shoe 70 is in the lowered position of FIG. 4, the repeater 70 therefore cannot pass through the cable burial tool 40. After the guide shoe 70 is rotated to the raised position of FIG. 5 to raise the cable 20 out of the slot 58, the guide plates 100 are moved to their open position with the second, larger spacing that permits the repeater 28 to pass therebetween and through the cable burial tool 40.

The feed horn 90 is preferably formed of two converging longitudinal segments 90a and 90b, each of which forms one-half of the longitudinal length of the feed horn 90. The two segments 90a and 90b are moved together and apart by a segment actuator 104, which is typically a hydraulic cylinder. The movable segments 90a and 90b permit the feed horn 90 to be split into the two longitudinal halves and separated. When the segments 90a and 90b and forced together, the feed horn 90 guides the cable 20 in the manner described previously. When the segments 90a and 90b are separated, the guide plates 100 are in their open position, and the guide shoe 70 is in its second position, there is an open path through the cable burial tool 40 which allows the cable 20 to be loaded into the cable burial tool 40 from the side, and without an end being threaded into the cable burial tool 40. This capability is important in many applications, where the cable 20 must be loaded into the cable burial tool 40 at an intermediate location along the length of the cable 20.

Figure 8:
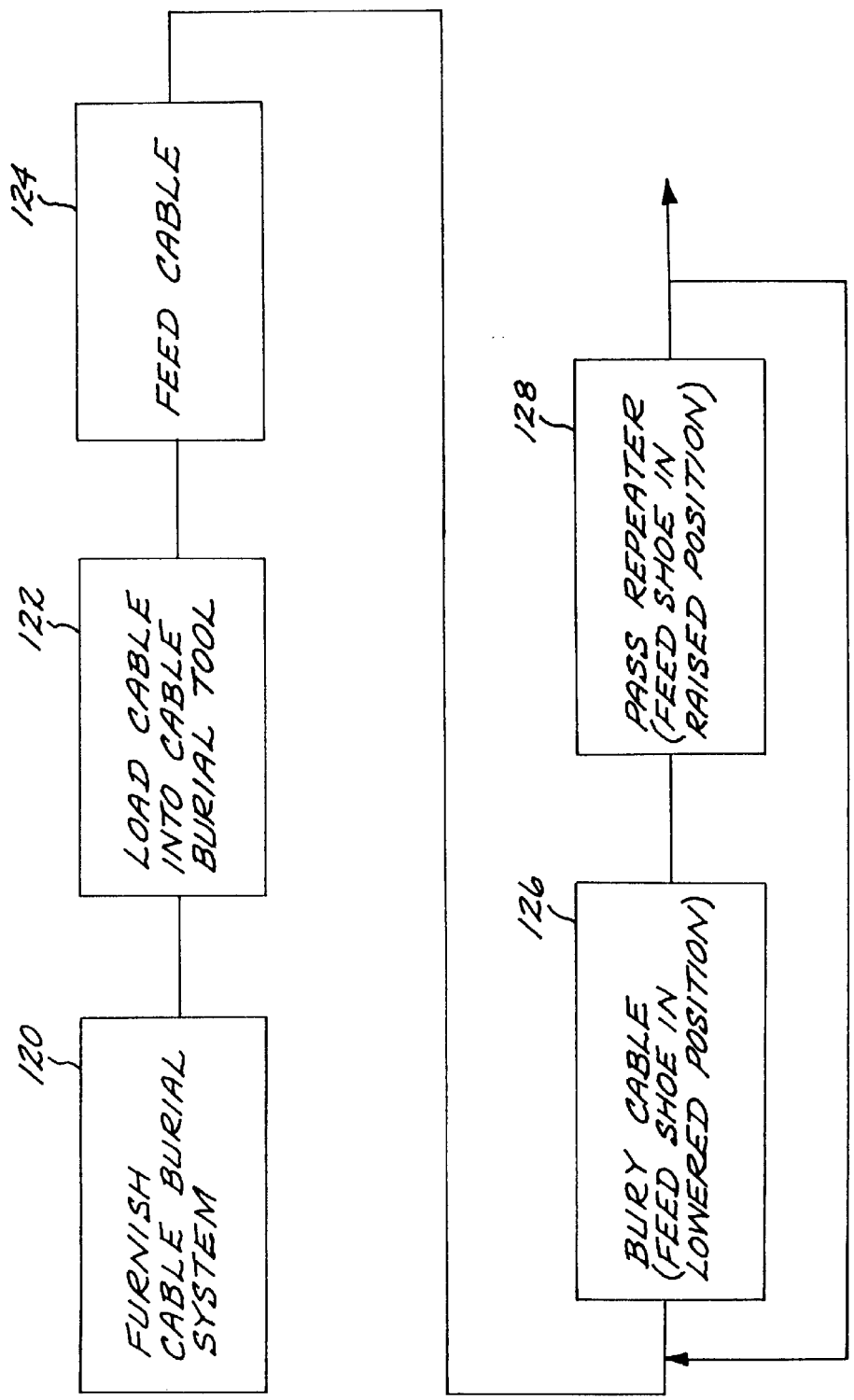
FIG. 8 is a block flow diagram of a preferred method for burying cable according to the invention.

FIG. 8 illustrates a preferred approach for practicing the invention. The cable burial system 30 as described above is furnished, numeral 120. The cable is loaded into the cable burial tool 40, numeral 122. The loading may be either using a free end of the cable 20 or from the side with the segments 90a and 90b separated, the guide plates 100 in their open position, and the guide shoe 70 in its second position. The loading by this approach may be accomplished either by divers or using a robot manipulator. The cable 20 is fed by the cable feed winch 42. As the cable is fed, the cable burial tool 40 is operated in either of two modes. To bury the cable 20, the guide plates 100 are closed to capture the cable 20 therebetween and to the periphery 72 of the feed shoe. The feed shoe 70 is thereafter rotated to its lowered position as shown in FIG. 4, numeral 126, and the cable 20 is buried at the depth $L_b$. To pass the repeater 28 and leave it resting on the sea floor 32 (that is, not buried in the sea floor), the feed shoe is rotated to its raised position and the guide plates 100 are opened, as shown in FIG. 5, numeral 128. This process is repeated whenever a repeater is to be passed through the cable burial tool 40.

A prototype of the present invention has been constructed and tested. Functional optical fiber cables 20 about 1–½ miles long and having diameters ranging from 0.06 inches to 0.432 inches, with repeaters 28 of diameter 9 inches and length 48 inches, have been successfully buried at burial depths of 24 inches into the sea floor, but with the repeaters 28 resting on the surface of the sea floor as described herein. The surface ship 36 moved at a rate up to 4.5 knots during the cable burial operation.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A cable burial system, the system comprising a cable burial tool having:

a base frame;

a blade extending downwardly from the base frame and including an external leading edge, the blade having a vertically oriented internal slot therein with a slot width, the slot having an upper end at a top of the blade and a lower end at a bottom of the blade;

a feed shoe with an arcuate feed shoe periphery and a feed shoe width less than the slot width of the blade, the feed shoe being pivotably connected to the base frame and pivotable between a lowered position wherein the feed shoe lies within the slot, and a raised position wherein the feed shoe lies outside of the slot; and a guide operable to guide a cable into the slot in contact with the feed shoe periphery when the feed shoe is in the lowered position.

2. The cable burial system of claim 1, further including a burial sled operable to travel through water.

3. The cable burial system of claim 2, further including a pivotal connection between the base frame and the burial sled.

4. The cable burial system of claim 3, further including an actuator operable to control a pivot angle between the base frame and the burial sled.

5. The cable burial system of claim 1, further including a jet opening in a periphery of the feed shoe, and a source of pressurized water in an interior manifold of the feed shoe and communicating with the jet opening in the periphery of the feed shoe.

6. The cable burial tool system of claim 1, wherein the feed shoe comprises a center housing having a center housing periphery defining the arcuate feed shoe periphery, and a pair of feed shoe plates, one of the feed shoe plates being positioned on either side of the center housing and extending above the feed shoe periphery so that the feed shoe plates and center housing cooperatively define a cable guide channel.

7. The cable burial system of claim 6, further including a jet opening in the center housing periphery, and a source of pressurized water in an interior manifold of the feed shoe and communicating with the jet opening in the periphery of the center housing.

8. The cable burial system of claim 1, wherein the guide comprises
 a feed horn affixed to the base frame with an outlet end adjacent to the upper end of the slot and centered on the slot.

9. The cable burial system of claim 8, wherein the feed horn comprises
 a longitudinally extending first segment and a longitudinally extending second segment, and
 a drive operable to sequentially separate and close together the first segment and the second segment.

10. The cable burial system of claim 1, wherein the guide comprises
 a pair of movable guide plates disposed adjacent to the upper end of the slot and centered on the slot, the guide plates being movable between a closed position with a first spacing sufficiently greater than the feed shoe width to permit the feed shoe to lie therebetween, and an open position having a second spacing greater than the first spacing.

11. The cable burial system of claim 1, further including a cable feed winch operable to feed cable into the guide.

12. The cable burial system of claim 11, wherein the cable feed winch introduces a reverse catenary curvature into the cable prior to the entry of the cable into the guide, relative to a curvature of the cable in the cable burial tool.

13. The cable burial system of claim 1, further including a wear plate affixed to the external leading edge of the blade.

14. The cable burial system of claim 1, wherein the feed shoe is rotatable in a rotation direction such that the feed shoe periphery moves in the same direction as a direction of cable payout when the feed shoe rotates from the raised position to the lowered position.

15. A cable burial system, the system comprising a cable burial tool having:
 a base frame;
 a blade extending downwardly from the base frame and including an external leading edge, the blade having a vertically oriented internal slot therein with a slot width, the slot having an upper end at a top of the blade and a lower end at a bottom of the blade;
 a feed shoe with an arcuate feed shoe periphery and a feed shoe width less than the slot width of the blade, the feed shoe being pivotably connected to the base frame and pivotable between a lowered position wherein the feed shoe lies within the slot, and a raised position wherein the feed shoe lies outside of the slot, the feed shoe including
  a jet opening in a periphery of the feed shoe, and
  a source of pressurized water in an interior manifold of the feed shoe and communicating with the jet opening in the periphery of the feed shoe;
 a guide operable to guide a cable into the slot in contact with the feed shoe periphery when the feed shoe is in the lowered position, wherein the guide comprises
  a feed horn affixed to the base frame with an outlet end adjacent to the upper end of the slot and centered on the slot, and
  a pair of movable guide plates disposed adjacent to the upper end of the slot and centered on the slot, the guide plates being movable between a closed position with a first spacing sufficiently greater than the feed shoe width to permit the feed shoe to lie therebetween, and an open position having a second spacing greater than the first spacing.

16. The cable burial system of claim 15, further including a burial sled operable to travel through water,
 a pivotal connection between the base frame and the burial sled, and
 an actuator operable to control a pivot angle between the base frame and the burial sled.

17. The cable burial system of claim 15, wherein the feed horn comprises
 a longitudinally extending first segment and a longitudinally extending second segment, and
 a drive operable to sequentially separate and close together the first segment and the second segment.

18. The cable burial system of claim 15, wherein the feed shoe is rotatable in a rotation direction such that the feed shoe periphery moves in the same direction as a direction of cable payout when the feed shoe rotates from the raised position to the lowered position.

* * * * *